United States Patent Office 2,979,422
Patented Apr. 11, 1961

2,979,422
COATING PROCESS
Theodor Bersin, 19 Ludwigstrasse, and Arthur Müller, 176 Varnbuelstrasse, both of St. Gallen, Switzerland
No Drawing. Filed Mar. 7, 1958, Ser. No. 719,738
8 Claims. (Cl. 117—106)

This invention relates to the surface treatment of synthetic plastic materials in the form of sheets, tubes and the like and particularly to the surface treatment of containers made of sheets of plastic materials, in order to diminish the permeability to gas of the materials and thereby protect the contents of hermetically sealed containers of thin-walled plastic materials from penetration of gases into the containers and from the loss of gaseous components of the container contents by passage through the container walls.

It is known that certain plastic materials, as for example polyethylene, are suitable for package making purposes and that the permeability to water and steam of polyethylene is relatively low. However, in the case of polyethylene, the permeability to gases such as oxygen, carbon dioxide, hydrogen and volatile aromatic and alcoholic substances is comparatively high. Therefore, substances contained in polyethylene containers are insufficiently protected against the penetration of oxygen into the containers and are thus subject to oxidation and are rendered unstable.

A container of thin-wall polyethylene which, for example, contains an aqueous solution and is maintained at a relatively high temperature, for example 40°–50° C., loses not only water vapor through the walls but oxygen and other components of the outside atmosphere pass through the container wall in exchange, whereby a sort of gas cushion is formed in the container and this process can result in continuous swelling and finally even in the bursting of the container. For practical purposes it is necessary to reduce the permeability of the container wall to gas without other modifications of the generally advantageous properties of plastic films. In addition reduction of the loss of water vapor is desirable, however, this does not represent the primary object of the present invention which is to substantially reduce the exchange of gases through the walls of containers of thin-walled plastic materials and particularly of thin-walled polyethylene containers. Other objects will be apparent from the following description and claims.

It has now been discovered that the disadvantages of the prior art may be overcome and the objects described above achieved by a process which broadly comprises coating thin-walled plastic substances, and particularly polyethylene, with a layer of protein according to the following general method which comprises the steps of: (1) treating a plastic surface to give it a hydrophilic character with a high amount of cation-exchange groups; (2) treating the hydrophilic surface with an aqueous protein solution, whereby a layer of protein is deposited and firmly held on to the surface of the plastic substances; and (3) tanning the protein layer to render it substantially insoluble in water. The protein layer applied by the process of this invention is firmly bonded to the plastic surface and does not separate therefrom when the plastic is subjected to the elevated temperatures which are usually encountered during shipping and storage.

Various methods have been developed to render the surfaces of plastics hydrophilic and any of the known methods can be used to obtain homogenous wetting of the plastic surface with an aqueous coating solution. Most of the known methods cause the formation of cation exchange groups on the surfaces of plastics. It has now been found that the cation exchange groups on the surface of a plastic enable a coat of protein to be bound firmly enough to the plastic surfaces so that the protein coating resists the high temperatures which are usual in shipping and storage and remains firmly bound. Various methods may be used to hydrophilize the surfaces of plastics and provide cation exchange groups on the surface thereof. There are quantitative differences in the amount of cation exchange groups produced by various oxidizing substances which are used to hydrophilize the surface of polyethylene. The duration of the action of the oxidizing agent also has an effect on the quantity of cation exchange groups formed. It is necessary to control and define the minimum of cation exchange groups on the plastic surface which are required in order that the protein coating be firmly bound to the plastic surface. It is not necessary to determine the degree to which the plastic surfaces have been made hydrophilic since a plastic surface has adequate hydrophilic properties if the surface has sufficient cation exchange groups.

The following examples illustrate one method of oxidizing a polyethylene surface to provide cation exchange groups and a method for measuring the degree of oxidation and amount of the cation exchange groups on the surface of the plastic, the latter method being hereinafter referred to as the MBR method.

Two groups of five sheets of 0.1 mm. thick, unprinted polyethylene five cm. wide and ten cm. long are immersed for five and thirty seconds, respectively, in a solution of pyrosulfuric acid in concentrated sulfuric acid, which has a concentration of sulfur trioxide of 25. The plastic sheets are washed well first in running water and then with distilled water and dried in a stream of warm air after removal from the oxidizing bath. The oxidized sheets and five unoxidized sheets are immersed for 10 minutes in a 0.15% solution of methylene blue, exhaustively washed with distilled water and dried. Each sheet is cut into fifteen equal parts, and these are extracted at room temperature with shaking with 5 ml. of an alcoholic hydrochloric acid solution containing one part of twice normal hydrochloric acid for each part of 96% ethanol. The optical density of the extraction liquids is measured in a spectrophotometer at 666 millimu, the absorption maximum of the methylene blue solution, against a blank consisting of an alcoholic hydrochloric acid solution. The values of the "optical density," hereinafter referred to as MBR values, give a measure of the number of cation exchange groups on the surface of the polyethylene. The oxidized sheets immersed for five seconds had an average MBR value of 0.183 and those immersed for thirty seconds had an average MBR value of 0.224. The unoxidized sheets had an average MBR value of 0.050.

Polyethylene sheets of the same size and quantity were exposed to gaseous chlorine for periods of 300, 600 and 1800 seconds and had average MBR value of 0.054, 0.063, and 0.082, respectively. Polyethylene sheets of the same size and quantity which were immersed for five and thirty seconds in a solution of chromsulfuric acid prepared by dissolving 0.509 gram of $CrO_3$ in 100 ml. of concentrated sulfuric acid, the solution contained one percent of chromsulfuric acid, $H_2SCrO_7$, had average MBR values of 0.144 and 0.147, respectively.

Polyethylene sheets having an MBR value, as low as 0.08 have been found to have adequate hydrophilic properties and sufficient cation exchange groups on the surface to provide good coating of the polyethylene surface with a protein, however, it is preferred that the MBR value be at least 0.150 and not substantially greater than about 0.250. If the MBR value is above about 0.250 the protein deposited on the surface does not adhere well.

It has also been found that oxidized polyethylene sheets lose a part of their cation exchange properties on heating since their MBR value is decreased. Therefore oxidized sheets should not be subjected to unnecessary heat before they are coated with a protein. Oxidized sheets having an MBR value of 0.112 had the same MBR value after standing at room temperature for six months but after exposure for one hour at 70° C. the MBR value had fallen to 0.085.

The two tests described below give a measure of the permeability to gases of thin-walled, hermetically sealed, polyethylene containers filled with an aqueous solution and show that the coating of a polyethylene sheet with a protein layer considerably reduces the permeability of the sheet to gases. In the first test the permeability of the containers was measured at elevated temperatures. Hermetically sealed containers of polyethylene having a wall thickness of 0.5 mm. which were filled with an aqueous solution were stored at 50° C. and 30% relative humidity for one or more periods of 24 hours. In the second test the permeability of the containers was determined by measuring the amount of oxidation of an ascorbic acid solution present in the containers. An ascorbinate solution at a pH of 5.5 containing 30 grams of ascorbic acid and 14.4 grams of sodium hydrogen carbonate in solution in 600 cc. of water, was filled into polyethylene bags having walls 0.5 mm. in thickness under conditions which excluded oxygen. The bags were stored at room temperature and after storage the ultra violet light transmission of the ascorbinate solution was measured against distilled water in a Beckman DU at 400 mu in Corex cuvettes of 10 mm. thickness. The ascorbinate solutions changed color even in the presence of insignificant quantities of oxygen. There is a good linear correlation between MBR value of the plastic sheet and ascorbic acid content.

The following table illustrates the relationship between MBR value and content of ascorbic acid. MBR value being given in the first column, transmission of ultra violet light in percent in the second and percent concentration of ascorbic acid in the third.

| | | |
|---|---|---|
| 0.001 | 100 | 5.00 |
| 0.011 | 98 | 4.97 |
| 0.186 | 65 | 4.60 |
| 0.500 | 31 | 4.19 |
| 0.700 | 20 | 3.85 |

The second test was used to determine the proteins which provided good reduction to permeability to gases and the first test was used to determine the bonding properties of a protein to a plastic surface.

The following examples illustrate various methods and materials used for the coating of thin-walled plastic materials with a protein:

Example 1

A polyethylene tube having a wall thickness of 0.1 mm. and an MBR value of 0.110, was soaked in a solution containing 3% by weight of gelatine and 5 mg. percent of sodium dodecyl-benzene-sulphonate, the temperature of the solution being 40° C. The tube was removed from the solution and dried at room temperature.

Example 2

A hermetically sealed container of polyethylene having a wall thickness of 0.1 mm. and an MBR value of 0.200, which was filled with an aqueous solution, was sprayed with a solution at 40° C. which contained 3% by weight of gelatine, until the surface of the container was completely coated. The wet container was immersed for twenty seconds in a chamber containing approximately 95% of gaseous formaldehyde, removed from the chamber and dried at room temperature.

Example 3

A hermetically sealed container of polyethylene having a wall thickness of 0.1 mm. and an MBR value of of 0.150, which was filled with an aqueous solution, was soaked in a solution at 40° C. containing 4% by weight of gelatine and 0.5% by weight of chrome alum having a basicity of 58%, until the surface was completely wet. The container was then removed from the solution and dried at room temperature.

Example 4

A hermetically sealed container of polyethylene having a wall thickness of 0.1 mm. and an MBR value of 0.100, which was filled with an isotonic solution of sodium chloride, was soaked in a solution at 40° C. which contained 0.5% by weight of chrome alum having a basicity of 5% and 2 mg. percent of $CrO_3$. The container was then removed from the solution and dried at room temperature.

Example 5

Thick-walled polyethylene bottles having an MBR value of 0.150 were soaked in a bath containing 40% by weight of gelatine, 0.5% by weight of chrome alum having a basicity of 58%, and 10% ethyl alcohol in aqueous solution until the external part of the bottle was completely wet. The bottles were removed from the solution and dried at room temperature.

Example 6

Sheets of polyethylene having a wall-thickness of 0.1 mm. and an MBR value of 0.110 were wetted on one side with a solution containing 3% by weight of gelatine, 0.5% by weight of chrome alum having a basicity of 60%, and 3 mg. percent of a wetting agent consisting of 70% by weight of sodium-dodecyl-benzene-sulphonate, 28% by weight of sodium sulphate and 2% of water. The sheets were removed from the solution, dried and used for the production of hermetically sealed containers.

Example 7

Sheets of polyvinyl chloride were wetted repeatedly on one side with a solution containing 2% by weight of gelatine and 5 mg. percent of $CrO_3$. The sheets were dried at room temperature and used in the production of hermetically sealed containers. The sealed containers were coated according to the method of Example 3.

Example 8

Hermetically sealed containers of a polyamide, having a wall-thickness of 0.05 mm., which were filled with an aqueous solution, were immersed repeatedly in a solution containing 1 mg. percent of $CrO_3$, and then coated according to the method of Example 4.

Example 9

A polyethylene container filled with water, having a wall-thickness of 0.1 mm. and an MBR value of 0.150 was immersed in a solution of fish glue in water. The fish glue solution was prepared by grinding thirty parts of powdered fish glue in one hundred and fifty parts of normal sodium hydroxide until a smooth dispersion had been formed and then the dispersion was diluted with one thousand parts of water. The container, after immersion in the solution, was immersed in a closed chamber containing 90% of gaseous formaldehyde for twenty seconds, and removed from the chamber and dried at room temperature.

Example 10

Containers were coated, according to Examples 1 to 8, by using a solution of ovalbumin prepared by grinding thirty parts of ovalbumin in water until a smooth dispersion was formed and then diluted to 750 parts with water. The diluted solution was allowed to stand for three hours and then divided into two equal parts. 0.25% by weight of chrome alum was added to one half of the solution and 0.5% by weight of chrome alum was added to the other half. The solutions were centrifuged and then contained in solution 3.5% by weight of ovalbumin. The pH of the solutions was 7.0.

Example 11

Forty parts of casein, which was prepared according to the method of Hammarsten, Zeitschrift für Physiologische Chemie, volume 7, page 227 (1883); volume 8, page 273 (1885), were well ground with fifty parts of normal sodium hydroxide and the smooth dispersion was diluted with one thousand parts of distilled water. 0.50% by weight of chrome alum was added to the diluted solution. The solution was centrifuged and used for coating containers according to the methods of Examples 1–8.

Example 12

Forty parts of casein, which was prepared according to the method of Hammarsten, were well ground with fifty parts of 0.1 normal sodium hydroxide and the smooth dispersion was diluted with one thousand parts of distilled water. The diluted solution was allowed to stand overnight at room temperature and then divided into two parts. 0.25% by weight and 0.5% by weight of chrome alum solutions, each having a basicity of 58.3%, were added to the two solutions, respectively. The solutions were centrifuged and the clear centrifugates contained 3.7% by weight of casein. The casein solutions were used in coating containers according to the methods of Examples 1–8.

A number of bags of polyethylene having a wall-thickness of 0.1 mm. filled with the ascorbinate solution of the second test were coated according to the examples given above and stored at room temperature for periods of time ranging from ten to twenty-eight days. The results of the tests are given below in tabular form, the coating method being identified in column 1, the duration of the test in days in column 2, the percent transmission of ultra violet light of the ascorbinate solution after standing in column 4, and the MBR value of the plastic sheet in column 3.

| | | | |
|---|---|---|---|
| Untreated | 10 | 0.748 | 18.0 |
| Example 1 | 10 | 0.027 | 94.0 |
| Example 1 but with 2% of gelatine | 10 | 0.157 | 69.6 |
| Example 1 but with 1% of gelatine | 10 | 0.162 | 68.8 |
| Example 1 but with 2.5% of gelatine | 11 | 0.050 | 89.1 |
| Untreated | 15 | 1,200 | 6.1 |
| Example 1 | 15 | 0.178 | 66.3 |
| Example 2 | 15 | 0.200 | 63.0 |
| Example 6 | 15 | 0.143 | 71.9 |
| Example 1 | 28 | 0.250 | 56.0 |
| Example 2 | 28 | 0.223 | 60.0 |
| Example 6 | 28 | 0.164 | 68.5 |

The results in the table indicate that coating with a 3% gelatine solution provides a superior protection against permeability to oxygen when compared with untreated and uncoated polyethylene bags. Although coating with a 2% solution of gelatine does not provide protection comparable to coating with a 3% solution of gelatine, nevertheless coating with a 1 to 2% solution of gelatine substantially improves the resistance to permeability to oxygen of polyethylene bags. Coating with gelatine solutions having a concentration of gelatine of less than 1% does not significantly reduce permeability to oxygen.

Polyethylene bags filled with water having a wall-thickness of 0.1 mm., were coated according to the method of Example 1 except that the concentration of gelatine was varied over the range of from 3% to 5%. The permeability to gas of the containers was determined according to the first test described above and it was found that bags coated by the use of 3% and 4% gelatine solutions were satisfactory but that bags coated with a gelatine solution having a concentration of 5% were unsatisfactory because the gelatine coating began to peel after two to three hours.

In general, proteins are suitable for use in coating which can be brought into aqueous solution. Examples 9 through 12 show the use of proteins other than gelatine in the coating process of the invention. The coatings of the examples were satisfactory as determined by the first and second tests described above. It is preferred that the protein solution be substantially fat-free and low in bacterial count. The temperature of the coated solution should be at least 30° C. and it is preferred that the temperature be not above 40° C. If the temperature is substantially outside the range of from 30° to 40° C., the coatings are irregular and have unsatisfactory adhesion to the surface of the plastic. The temperature of the coating bath should be controlled so that it does not fluctuate except within narrow limits in order that the viscosity of the protein solution remain relatively constant.

The gelatine used in Examples 1 to 8 had a viscosity of 4.8 centipoises in a concentration of 4% by weight and at a temperature of 35° C., but when the temperature of the solution was 40° C. the viscosity was 5.0 centipoises. The viscosity of the coating bath may vary 0.2 centipoise and still produce reliable results at a temperature within the range of from 35° to 40° C., when gelatine is used.

Photo-gelatine is specially suitable for use in coating provided it has a relatively low starting viscosity, i.e. about 4.7 centipoises when it is in a concentration of 4% by weight in water at 40° C. The gelatine solution should have a relatively high stiffness as measured by the Bloom Test. The self tanning number of a gelatine also gives a strong indication as to the suitability of the gelatine for use in coating according to the method of this invention. The self tanning number may be defined as the time elapsing from the addition of a basic chrome alum solution to the gelatine solution until the viscosity of the solution has reached 8.7 centipoises. The self tanning number of a gelatine solution may be determined by the following method: 23.3 ml. of a chrome alum solution having a basicity of 58.3%, which corresponds to a chrome alum concentration of 0.5% by weight, are added to 600 ml. of a 4% gelatine solution having a starting viscosity of approximately 4.7 centipoises. The viscosity is determined at 40° C. with a Synchro-Lectic Viscometer type LVT from Brookfield, Stroughton, Mass., at intervals until the viscosity of the solution is 8.7 centipoises.

The viscosity of the gelatine solution should not increase more than 4 centipoises during a period of ten hours after the above described solution has been made. Coating according to the method of this invention by use of such a gelatine provides satisfactory reduction in permeability to gases. If the gelatine does not come within the above limitation the coating is substantially less satisfactory.

The results of coating polyethylene bags filled with water according to the methods of Examples 3, 9, 10, 11 and 12 are given below in tabular form. The coated bags are subjected to the first test described above and the gas volume in the bags was measured after seven days storage at a temperature of 50° C. and a relative humidity of 30%.

The following bags were uncoated

| Bag number | Bag surface in cm.² | Gas volume | cc. of gas per 100 cm.² of surface |
|---|---|---|---|
| 1 | 101 | 14.9 | 14.8 |
| 2 | 139 | 36.1 | 26.0 |
| 3 | 108 | 28.1 | 26.0 |
| 4 | 124 | 27.6 | 22.2 |
| 5 | 107 | 15.9 | 14.9 |
| 6 | 132 | 16.5 | 14.9 |
| 7 | 115 | 20 | 17.4 |
| 8 | 144 | 21 | 14.5 |
| 9 | 108 | 12.5 | 11.5 |
| 10 | 120 | 12 | 10.0 |
| 11 | 120 | 17 | 14.2 |

The following bags were coated according to the method of Example 3

| Bag number | Bag surface in cm.² | Gas volume | cc. of gas per 100 cm.² of surface |
|---|---|---|---|
| 1 | 106 | 5.1 | 4.7 |
| 2 | 115 | 2.0 | 1.7 |
| 3 | 117 | 2.5 | 2.1 |
| 4 | 124 | 3.8 | 3.1 |
| 5 | 130 | 2.8 | 2.1 |
| 6 | 120 | 2.0 | 1.7 |
| 7 | 132 | 4.5 | 3.4 |
| 8 | 126 | 3.5 | 2.8 |
| 9 | 120 | 3 | 2.5 |
| 10 | 120 | 2 | 1.7 |

The following bags were coated according to the method of Example 9

| Bag number | Bag surface in cm.² | Gas volume | cc. of gas per 100 cm.² of surface |
|---|---|---|---|
| 1 | 120 | 16.5 | 13.7 |
| 2 | 132 | 13.5 | 10.3 |
| 3 | 120 | 13 | 10.8 |
| 4 | 120 | 15.5 | 13.0 |
| 5 | 115 | 1 | 0.9 |

The following bags were coated according to the method of Example 10

| Bag number | Bag surface in cm.² | Gas volume | cc. of gas per 100 cm.² of surface |
|---|---|---|---|
| 1 | 115 | 4.2 | 3.7 |
| 2 | 110 | 6.1 | 5.6 |
| 3 | 122 | 18.7 | 15.3 |
| 4 | 119 | 14.7 | 12.3 |
| 5 | 120 | 10 | 8.3 |
| 6 | 120 | 6.5 | 5.4 |
| 7 | 132 | 19 | 14.4 |

The following bags were coated according to the method of Example 11

| Bag number | Bag surface in cm.² | Gas volume | cc. of gas per 100 cm.² of surface |
|---|---|---|---|
| 1 | 156 | 8.5 | 5.5 |
| 2 | 108 | 7.5 | 6.9 |
| 3 | 120 | 4 | 3.3 |

The following bags were coated according to the method of Example 12

| Bag number | Bag surface in cm.² | Gas volume | cc. of gas per 100 cm.² of surface |
|---|---|---|---|
| 1 | 124 | 12.3 | 9.9 |
| 2 | 122 | 1.7 | 9.6 |
| 3 | 121 | 9.1 | 7.5 |
| 4 | 114 | 9.3 | 8.2 |
| 5 | 110 | 3.9 | 3.5 |
| 6 | 115 | 5.5 | 4.8 |
| 7 | 108 | 6 | 5.5 |
| 8 | 120 | 10 | 8.3 |
| 9 | 120 | 10 | 8.3 |

The results of the tests given above show that the coatings with the various proteins provide a satisfactory degree of reduction in the permeability of the plastic films to gases.

Since the layer of protein on the surface of the plastic is water soluble, it is necessary that it be treated to reduce its solubility in water and this is done by tanning the protein after it has been deposited on the plastic surface; however if the bags are never to be exposed to water, tanning of the protein is not necessary. Formaldehyde as well as chromium complex salts, may be used for tanning the protein.

Gaseous formaldehyde may be used to tan the protein after the protein has been deposited on the surface of the plastic. The preferred method to tan the protein by use of the formaldehyde gas is to immerse the bags in the formaldehyde gas immediately after coating and before the layer of protein deposited on the plastic surface has dried. The duration of the exposure of the wet protein layer to formaldehyde gas and the concentration of the formaldehyde gas is directly related to the degree of tanning effected. At a gas concentration of 70% to 100% and an exposure time of less than three minutes and greater than ten seconds, satisfactory tanning is accomplished; however, at the above concentration, the preferred time of exposure is 10 to 50 seconds. If the exposure time is greater than three minutes and less than ten seconds, according to the above conditions, the film readily peels away from the plastic sheet or is sticky and not waterproof.

Formaldehyde can also be present in the coating solution at a concentration of within the range from 1 to 7.6% by weight/100 ml. and provide good tanning of the protein coating.

Only basic chromium salts are satisfactory for use in tanning a protein film deposited on the plastic sheets according to the examples given above. A satisfactory tanning solution may be prepared by dissolving nine grams of $KCr(SO_4)_2 \cdot 12H_2O$ in 90 ml. of water and adding this to an amount of an aqueous solution of sodium carbonate sufficient to adjust the basicity to the desired value. A basicity of the chrome tanning solution within the range from about 15% to about 60% has been found satisfactory. A protein layer deposited on a plastic sheet is not sticky and does not peel off after tanning with a solution of chrome alum having a basicity within the above range when exposed to the elevated temperatures and high humidity of the first test described above when stored under water for several days. It is preferred that the concentration of chrome alum in the tanning solution be within the range from 0.3 to 1.0%. However, if the concentration of gelatine in the tanning solution is as high as 5%, gelatinization occurs within a few minutes with the concentration of chrome alum at 1.2% and the basicity at 58.3%. The preferred condition for coating and tanning with a chrome alum solution are as follows: a concentration of protein within the range of 3% to 4% by weight, a content of chrome alum of about 0.5% but within the range of from 0.2 to 1.0% by weight, and a basicity of the chrome alum solution of less than 50%.

The coating methods described above can be generally used successfully for coating synthetic polymeric substances which have cation exchange groups on the surface, as determined by the MBR tests described above. If the MBR value is sufficiently high, the plastic substance may be coated according to the above method without a preliminary oxidizing treatment such as that described above as necessary to provide cation exchange groups on a surface of polyethylene.

It will be apparent that the method described above may be modified and such modification will be apparent to those skilled in the art; therefore, it is intended that the described method not be construed as imposing unnecessary limitations on the attendant claims.

We claim:

1. A method of coating a hydrophobic synthetic plastic substance which has been treated to have anionic groups on its surface and to have an MBR value within the range of 0.08 to 0.25, comprising the steps of: applying an aqueous solution of a water-soluble protein having a concentration of protein of 1% to 5% by weight, to the surface of the plastic whereby the protein is bound to the surface of the plastic, and drying the protein coated surface.

2. A method of coating a hydrophobic synthetic plastic substance which has been treated to have anionic groups on its surface and to have an MBR value within the range of 0.08 to 0.25, comprising the steps of: applying an aqueous solution of a water-soluble protein having a concentration of protein of 1% to 5% by weight, to the surface of the plastic whereby the protein is bound to the surface of the plastic, tanning the protein bound to said surface and drying the protein coated surface.

3. The method of claim 2 wherein the tanning step comprises exposing the surface bound protein to gaseous formaldehyde.

4. The method of claim 2 wherein the hydrophobic plastic substance is polyethylene.

5. A method of coating a hydrophobic synthetic plastic substance which has been treated to have anionic groups on its surface and to have an MBR value within the range of 0.08 to 0.25, comprising the steps of: applying an aqueous solution of (a) a water-soluble protein having a concentration of protein of 1% to 5% and (b) a tanning agent selected from the group consisting of formaldehyde and a basic salt of chromium, to the surface of the plastic whereby a tanned protein is bound to the surface of the plastic, and drying the protein coated surface.

6. The method of claim 5 wherein the tanning agent in the aqueous solution is formaldehyde in a concentration within the range of 1% to 7% by weight.

7. The method of claim 5 wherein the tanning agent in the aqueous solution is chrome alum in a concentration within the range of 0.25% to 1.0% by weight and the basicity of the solution is within the range of from 30% to 60%.

8. The method of claim 5 wherein the protein is gelatin having a viscosity within the range of from 35 to 37 centipoises at 40° C. in water at a concentration of 17.75% weight/volume.

References Cited in the file of this patent

UNITED STATES PATENTS

| | | |
|---|---|---|
| 2,011,246 | Hyden | Aug. 13, 1935 |
| 2,361,302 | Little | Oct. 24, 1944 |
| 2,430,585 | Russell et al. | Nov. 11, 1947 |
| 2,461,473 | Kaszuba | Feb. 8, 1949 |
| 2,652,345 | Jones | Sept. 15, 1953 |